G. W. CLENDON.
PULVERIZED FUEL AND AIR FEEDER AND MIXER.
APPLICATION FILED JULY 17, 1914.
1,254,393.
Patented Jan. 22, 1918.
3 SHEETS—SHEET 1.
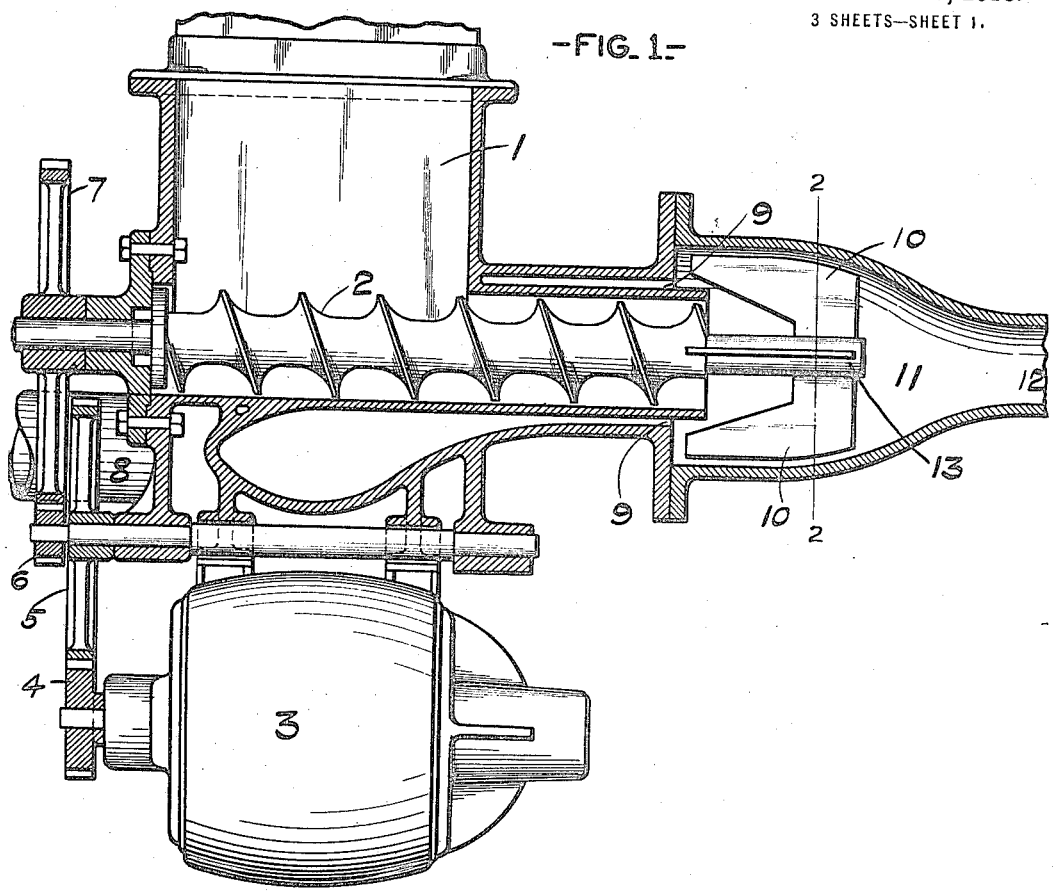
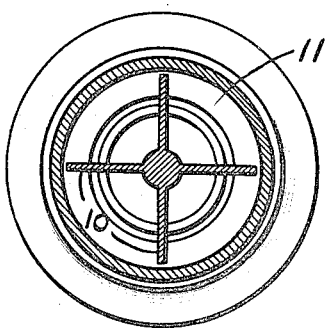
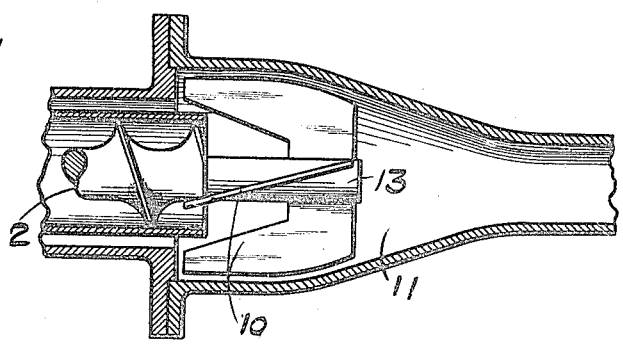
WITNESSES
INVENTOR
George W. Clendon

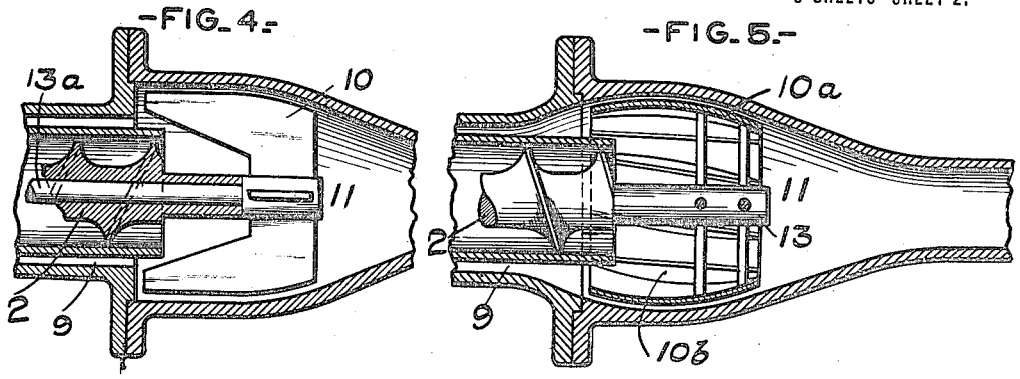
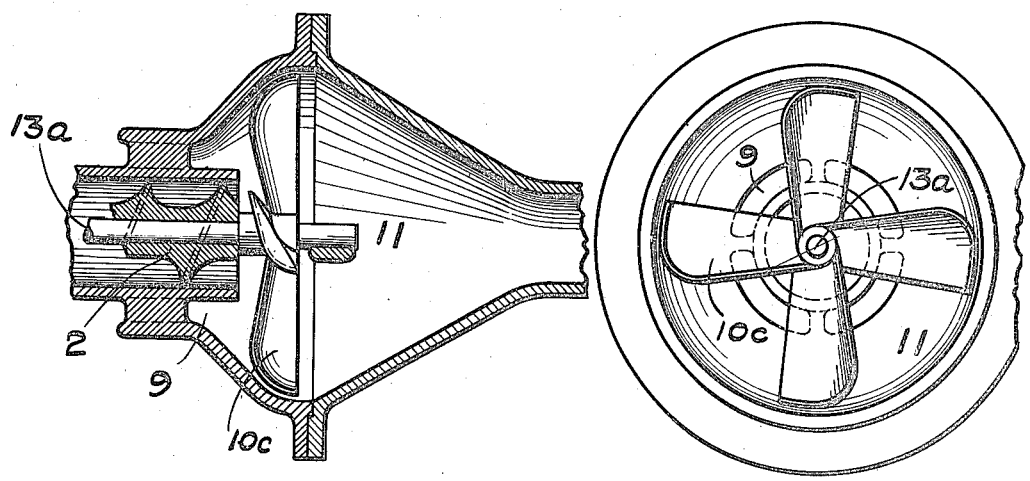
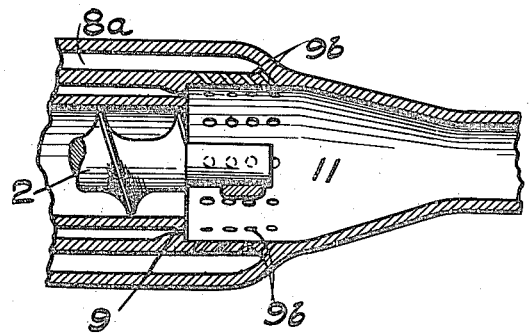

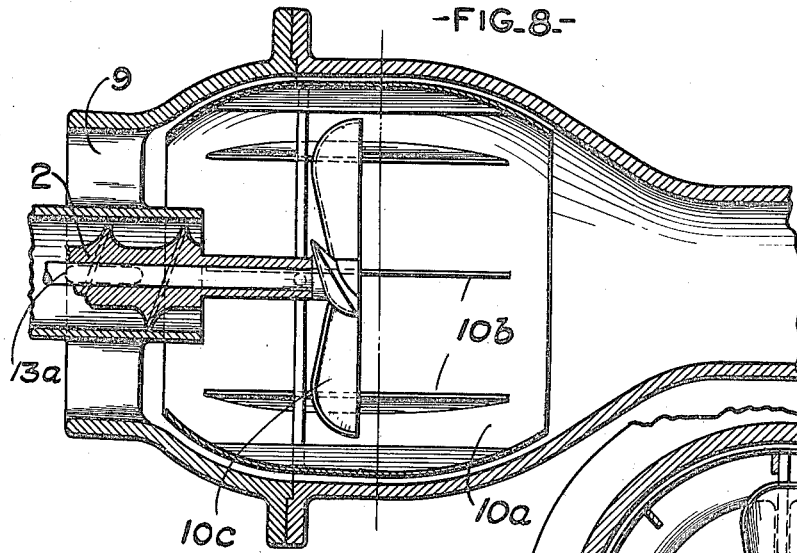
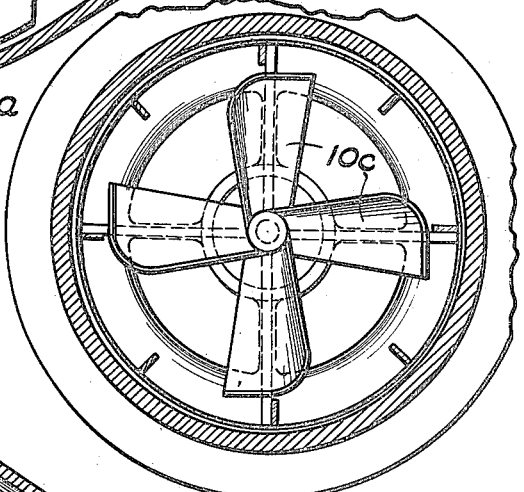
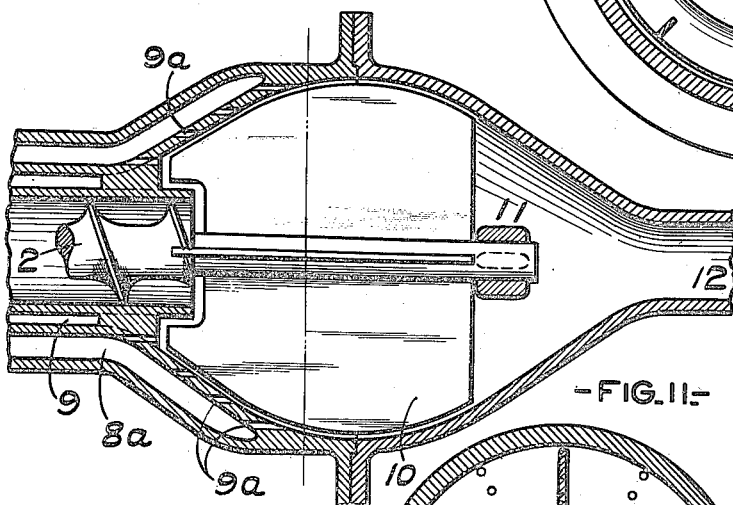
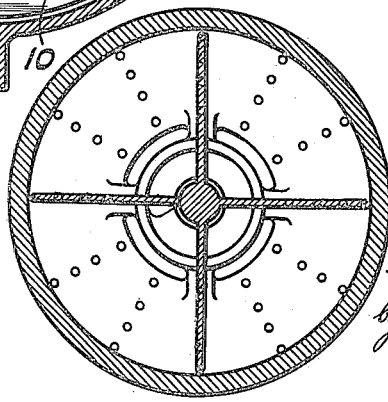

UNITED STATES PATENT OFFICE.

GEORGE W. CLENDON, OF NEW YORK, N. Y., ASSIGNOR, BY MESNE ASSIGNMENTS, TO LOCOMOTIVE PULVERIZED FUEL COMPANY, A CORPORATION OF DELAWARE.

PULVERIZED-FUEL AND AIR FEEDER AND MIXER.

1,254,393.  Specification of Letters Patent.  Patented Jan. 22, 1918.

Application filed July 17, 1914. Serial No. 851,453.

*To all whom it may concern:*

Be it known that I, GEORGE W. CLENDON, a citizen of the United States, and a resident of the borough of Manhattan, in the city, county, and State of New York, have invented a certain new and useful Improvement in Pulverized-Fuel and Air Feeder and Mixer, of which improvement the following is a specification.

This invention relates to pulverized or fine fuel, and has for its object to provide an improved feeding and mixing device whereby the fuel and blast of air may be continuously fed together in the desired quantities, into a mixing chamber, and there thoroughly agitated, broken up, and commingled so as to repeatedly bring the particles of fuel into contact with the air blast, whereby the elements will be combined to form a thoroughly impregnated and saturated fuel-air combustible which is then delivered at the desired velocity through the outlet leading to the furnace.

For accomplishing this object, I provide as the fundamental features, a mixing chamber, means for introducing a blast of air therein, means for feeding the pulverized fuel in the desired quantities into said air current within the chamber, and means for agitating and commingling said elements within said chamber, whereby the fuel is repeatedly subjected to the action of the air current, but is not retarded in its passage through said chamber. The mixing chamber preferably has a tapering or contracted outlet for giving the desired velocity to the mixed combustible, as it is discharged to the furnace.

Various forms of devices embodying these features may be designed for carrying out my invention, and in the accompanying drawings I have shown several modifications for this purpose.

Figure 1 is a vertical longitudinal section of a fuel feeding and mixing device embodying my improvement; Fig. 2, a transverse section thereof taken on the line 2—2; Fig. 3, a longitudinal section of the mixing chamber showing a slightly modified form of vanes; Fig. 4, a similar section showing a separate shaft for operating the vanes; Fig. 5, a similar section showing another modified form of mixer; Figs. 6 and 7, a longitudinal section and a transverse section, respectively, showing another modification; and Figs. 8 to 12 inclusive, corresponding sections showing still other modifications.

As shown in Fig. 1, the apparatus comprises a fuel hopper, 1, into which the pulverized fuel is supplied, an air conduit, 8, having an orifice, 9, for discharging a blast of air in the form of a hollow column into the mixing chamber, 11, feeding means, such as conveyer screw, 2, for delivering the pulverized fuel in predetermined quantities into the mixing chamber through the interior of the hollow column of the air blast, and an agitating device such as the rotatable vanes, 10, mounted in the mixing chamber on a shaft, 13, secured to the end of the conveyer, a suitable motor, 3, and connecting gears, 4, 5, 6, and 7, being employed for driving the feeding device. The mixing chamber is provided with flaring walls converging toward the outlet, 12, which is connected by a suitable tube or conduit with a furnace.

Upon entering the mixing chamber from the conveyer, the pulverized fuel falls by gravity into the blast or column of air entering through the orifice, 9, and a portion of the fuel is thus mixed with the air and carried by the blast directly through the mixing chamber to the outlet, 12. The other portion of the pulverized fuel which falls through the air blast is then taken up by the revolving vanes, 10, and carried around and upward until it is again precipitated into the blast or current of air whereupon other portions of fuel are mixed with the air and carried to the outlet. This action is repeated continuously during the operation of the device, until all of the fuel introduced is brought into intimate contact with the air current and thoroughly commingled therewith, thus being combined as a complete and homogeneous combustible mixture as it passes through the outlet. As the velocity of the air blast is reduced by its expansion within the mixing chamber, and by impinging upon the fuel, the walls of the said chamber are tapered or converged toward the outlet so as to increase the velocity of the mixed combustible as it escapes through the outlet, 12, to substantially equal that of the blast entering the mixing chamber.

It is important that the outlet end of the fuel casing or conduit terminate at a point close to the air blast orifice at the inner end of the mixing chamber, and that the rotatable vanes should also be located directly at the end of said fuel conduit and extend out radially through said air column, whereby such portions of the pulverized fuel as may fall through the air column are immediately taken up by the revolving vanes and not allowed to settle or accumulate at any point to obstruct or clog up the mixing chamber.

In some instances, it may be advantageous to give the intermingled blast and fuel a whirling motion, and for this purpose the agitating vanes, 10, may be curved or placed at an angle to the longitudinal axis, as indicated in Fig. 3. They may also be driven by a shaft 13$^a$, separate from the conveyer, and at a different speed if desired, as shown in Fig. 4.

As shown in Fig. 5, the agitating device is in the form of a hollow shell, 10$^a$, which may conform to the flaring walls of the mixing chamber, and if desired, may also be provided with vanes, 10$^b$, upon its inner surface.

In the construction shown in Figs. 6, 7, 8, and 9, the current of air instead of being introduced as a blast under pressure, is induced by a suction fan, 10$^c$, mounted within the mixing chamber on a separate shaft, 13$^a$, which may be driven at the desired speed. In this case, the fan serves not only to induce the current of air, but also as the agitating device to cause the thorough commingling of the air and fuel. As shown in Figs. 8 and 9, the agitating shell, 10$^a$, having blades, 10$^b$, is also employed for assisting in the mixing of the air and fuel.

The modification shown in Figs. 10 and 11, is similar to that of Fig. 1, except that an additional air supply conduit, 8$^a$, having a series of perforations, 9$^a$, is employed for introducing a further supply of air in line with the outer portion of the agitating vanes, 10, and thereby assists in the mixing operation. As shown in Fig. 12, the vanes are dispensed with, and the air jets, 9$^b$, from the additional air supply, 8$^a$, are directed at an angle into the mixing chamber, to serve as an agitating means for assisting in the commingling of the air and fuel therein.

In all of these modifications it will be noted that the agitating means operates to assist in the thorough commingling of the fuel and the air in the mixing chamber, but does not retard the passage of the fuel therein.

In the various modifications in which a rotatable device is employed for commingling the fuel and air in the mixing chamber, it will be noted that the axis of rotation is substantially parallel with the direction of the air blast, and in the modification shown in Figs. 1, 4 and 10, the blades or vanes of the agitating device are arranged in planes also parallel with said axis, so as not to oppose or retard the passage of the mixture in said chamber. In Figs. 3, 6 and 8, the vanes are curved in such direction as to assist the passage of the mixture to the chamber.

While, according to the preferred construction, the air blast is introduced in the form of a hollow column, it is not essential that the orifice should necessarily be in the form of a complete annulus open continously all the way around, since, for structural or other reasons, it may be interrupted by bridge pieces at certain portions, or may be formed in other suitable shapes, if desired.

Having now described my invention, what I claim as new and desire to secure by Letters Patent is:

1. In a pulverized fuel apparatus, the combination of a mixing chamber having a discharge outlet, an air conduit having an orifice for discharging a hollow column of air into said chamber, a fuel conduit discharging within the hollow air column and terminating at the inner end of said chamber, means for feeding pulverized fuel at a predetermined rate through said fuel conduit, and a non-retarding rotatable device having its axis parallel with the air column and located at the end of the fuel conduit for agitating and commingling the fuel and air in said chamber.

2. In a pulverized fuel apparatus, the combination of a mixing chamber having a discharge outlet, an air conduit having an orifice opposite said outlet, for discharging a hollow column of air into said chamber, a fuel conduit having its discharge end within the hollow air column at the inner end of said chamber, means for feeding pulverized fuel at a predetermined rate through said conduit and into the hollow column of air, and a non-retarding means located at the end of the fuel conduit for agitating and commingling the fuel and air in said chamber.

3. In a pulverized fuel apparatus, the combination of a mixing chamber having a discharge outlet, an air conduit having an orifice opposite said outlet, for discharging a hollow column of air into said chamber, a fuel conduit having its discharge end within the hollow air column at the inner end of said chamber, means for feeding pulverized fuel at a predetermined rate through said conduit and into the hollow column of air, and non-retarding, rotatable vanes located at the end of the fuel conduit for agitating and commingling the fuel and air in said chamber.

4. In a pulverized fuel apparatus, the combination of a mixing chamber having its walls converging toward the outlet, an air conduit having an orifice opposite said outlet, for discharging a hollow column of air into said chamber, a fuel conduit having its discharge end within the hollow air column at the inner end of said chamber, means for feeding pulverized fuel at a predetermined rate through said conduit and into the hollow column of air, and non-retarding, rotatable vanes located at the end of the fuel conduit for agitating and commingling the fuel and air in said chamber.

5. In a pulverized fuel apparatus, the combination of a mixing chamber having a discharge outlet, an air conduit having an orifice for discharging a hollow column of air into said chamber, a fuel conduit discharging within the hollow air column at the inner end of said chamber, a conveyer for feeding pulverized fuel through said conduit, and a non-retarding rotatable device driven by the conveyer and located at the end of the fuel conduit for agitating and commingling the fuel and air in said chamber.

6. In a pulverized fuel apparatus, the combination of a mixing chamber having a discharge outlet, an air conduit having an orifice for discharging a hollow column of air into said chamber, a fuel conduit discharging within the hollow air column at the inner end of said chamber, a screw conveyer for feeding pulverized fuel through said conduit, and a plurality of non-retarding rotatable vanes mounted on the shaft of the conveyer at the end of the fuel conduit for agitating and commingling the fuel and air in said chamber.

7. In a pulverized fuel apparatus, the combination of a mixing chamber having a discharge outlet, an air conduit having an orifice for discharging a blast of air into said chamber, means for feeding pulverized fuel at a predetermined rate into the air blast in said chamber, a non-retarding means for agitating and commingling the fuel and air in said chamber and an additional air supply means having orifices discharging into said chamber.

8. In a pulverized fuel apparatus, the combination of a mixing chamber having a discharge outlet, an air supply means having an orifice adapted to discharge a hollow column of air into said chamber, means for feeding pulverized fuel at a predetermined rate within the hollow air column into said chamber, a non-retarding means for agitating and commingling the fuel and air in said chamber, and an additional air supply means having orifices located around the main air supply and discharging into said chamber.

9. In a pulverized fuel apparatus, the combination of a mixing chamber having a discharge outlet, an air supply means having an orifice adapted to discharge a hollow column of air into said chamber, means for feeding pulverized fuel at a predetermined rate within the hollow air column into said chamber, an additional air supply means having orifices located around the main air supply and discharging into said chamber, and a rotatable mixing device located in said air currents within said chamber.

10. In a pulverized fuel apparatus, the combination of a mixing chamber having a discharge outlet, an air conduit having an orifice for discharging a hollow column of air into said chamber, a fuel conduit discharging within the hollow air column at the inner end of said chamber, means for feeding pulverized fuel at a predetermined rate through said fuel conduit, and a plurality of non-retarding rotatable vanes located at the end of said fuel conduit and extending out radially through said hollow air column for agitating and commingling the fuel and air in said chamber.

GEORGE W. CLENDON.

Witnesses:
EMILY L. MYERS,
ALFRED H. WILLETT.